United States Patent
Kim et al.

(10) Patent No.: US 9,560,685 B2
(45) Date of Patent: Jan. 31, 2017

(54) METHOD AND DEVICE FOR TRANSMITTING D2D DATA IN WIRELESS COMMUNICATION SYSTEM

(71) Applicant: LG Electronics Inc., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 81 days.

(21) Appl. No.: 14/395,226

(22) PCT Filed: Apr. 22, 2013

(86) PCT No.: PCT/KR2013/003419
§ 371 (c)(1),
(2) Date: Oct. 17, 2014

(87) PCT Pub. No.: WO2013/157906
PCT Pub. Date: Oct. 24, 2013

(65) Prior Publication Data
US 2015/0071212 A1    Mar. 12, 2015

Related U.S. Application Data

(60) Provisional application No. 61/635,875, filed on Apr. 20, 2012.

(51) Int. Cl.
H04W 76/02 (2009.01)
H04W 72/04 (2009.01)
H04W 74/08 (2009.01)
H04W 76/04 (2009.01)
H04W 72/12 (2009.01)

(52) U.S. Cl.
CPC ......... *H04W 76/023* (2013.01); *H04W 72/042* (2013.01); *H04W 74/0833* (2013.01); *H04W 72/1284* (2013.01); *H04W 76/043* (2013.01)

(58) Field of Classification Search
CPC .......... H04W 76/023; H04W 74/0833; H04W 72/042; H04W 72/43
USPC ........................................................ 370/329
See application file for complete search history.

(56) References Cited

U.S. PATENT DOCUMENTS

| | | | | |
|---|---|---|---|---|
| 9,319,931 | B2* | 4/2016 | Lim | H04W 72/085 |
| 9,320,047 | B2* | 4/2016 | Li | H04W 72/085 |
| 2006/0168343 | A1* | 7/2006 | Ma | H04W 52/38 |
| | | | | 709/245 |
| 2007/0104138 | A1* | 5/2007 | Rudolf | H04W 72/0406 |
| | | | | 370/329 |

(Continued)

FOREIGN PATENT DOCUMENTS

| | | |
|---|---|---|
| WO | 2011051745 | 5/2011 |
| WO | 2011133004 | 10/2011 |

*Primary Examiner* — Warner Wong
(74) *Attorney, Agent, or Firm* — Dentons US LLP

(57) ABSTRACT

A method for transmitting device-to-device (D2D) data in a wireless communication system is provided. A first terminal establishes a D2D link with a second terminal. The first terminal transmits a scheduling request (SR) for an uplink and an SR for the D2D link to a base station. The first terminal receives, from the base station, scheduling information on the D2D link determined on the basis of the SR for the D2D link. The first terminal transmits D2D data to the second terminal on the basis of the scheduling information

14 Claims, 9 Drawing Sheets

(56) References Cited

U.S. PATENT DOCUMENTS

| | | | |
|---|---|---|---|
| 2007/0230423 A1* | 10/2007 | Yoshida | H04W 76/02 370/338 |
| 2008/0259853 A1* | 10/2008 | Ito | H04L 12/5691 370/329 |
| 2009/0016232 A1* | 1/2009 | Kwon | H04W 76/023 370/252 |
| 2009/0116434 A1* | 5/2009 | Lohr | H04L 5/0007 370/329 |
| 2010/0009675 A1* | 1/2010 | Wijting | H04W 72/02 455/426.1 |
| 2010/0189046 A1* | 7/2010 | Baker | H04L 5/0007 370/329 |
| 2010/0189048 A1* | 7/2010 | Baker | H04L 5/0037 370/329 |
| 2011/0082940 A1* | 4/2011 | Montemurro | H04L 69/24 709/227 |
| 2011/0228666 A1* | 9/2011 | Barbieri | H04W 76/023 370/216 |
| 2011/0237231 A1 | 9/2011 | Horneman et al. | |
| 2011/0312331 A1 | 12/2011 | Hakola et al. | |
| 2012/0093098 A1 | 4/2012 | Charbit et al. | |
| 2012/0113922 A1* | 5/2012 | Kim | H04W 72/1284 370/329 |
| 2012/0184306 A1* | 7/2012 | Zou | H04W 76/023 455/458 |
| 2012/0213183 A1* | 8/2012 | Chen | H04W 72/1278 370/329 |
| 2013/0059583 A1* | 3/2013 | Van Phan | H04W 72/04 455/435.1 |
| 2013/0064103 A1* | 3/2013 | Koskela | H04W 72/1284 370/252 |
| 2013/0170476 A1* | 7/2013 | Baker | H04W 72/0406 370/336 |
| 2014/0177564 A1* | 6/2014 | Ma | H04W 72/1289 370/329 |
| 2015/0023267 A1* | 1/2015 | Lim | H04L 1/1854 370/329 |
| 2015/0117239 A1* | 4/2015 | Lindoff | H04W 72/08 370/252 |
| 2015/0146633 A1* | 5/2015 | Kalhan | H04L 1/1607 370/329 |

* cited by examiner

METHOD AND DEVICE FOR TRANSMITTING D2D DATA IN WIRELESS COMMUNICATION SYSTEM

This application is a 35 USC §371 National Stage entry of International Application No. PCT/KR2013/003419 filed on Apr. 22, 2013, and claims priority to U.S. Provisional Application No. 61/635,875 filed on Apr. 20, 2012, all of which are hereby incorporated by reference in their entireties as if fully set forth herein.

BACKGROUND OF THE INVENTION

Field of the invention

The present invention relates to a wireless communication system, and more particularly, to a method of transmitting device-to-device (D2D) data and an apparatus using the method.

Related Art

Long term evolution (LTE) based on $3^{rd}$ generation partnership project (3GPP) technical specification (TS) release 8 is a promising next-generation mobile communication standard. Recently, LTE-advanced (LTE-A) based on 3GPP TS release 10 supporting multiple carriers is under standardization.

According to a downlink control information (DCI) format 1A-based physical downlink control channel (PDCCH) order of LTE and LTE-A systems, an eNodeB (eNB) allows a user equipment (UE) in an RRC_CONNECTED mode to transition from an out-of-synch mode to an in-sync mode by transmitting a command to transmit buffer data, and the UE in the in-sync mode performs physical random access channel (PRACH) transmission. This is similar to an operation in which the UE transmits buffer data by using an uplink PRACH or a scheduling request (SR). In other words, the PDCCH order implies that the eNB commands the UE to achieve a requirement of the eNB (i.e., eNB-to-UE data transmission using a downlink carrier).

The present invention proposes a method in which the eNB commands a designated UE pair to perform D2D communication through a PDCCH and instructs to exchange information between UEs through an uplink carrier/band. The information exchange between the UEs may be called UE-to-UE or device-to-device (D2D) communication, direct communication, point-to-point (P-to-P) communication, etc. The UE-to-UE communication may decrease a waste of a radio resource and a factor of causing an interference.

SUMMARY OF THE INVENTION

The present invention provides a method of transmitting device-to-device (D2D) data in a wireless communication system, and an apparatus using the method.

The present invention also provides a resource allocation method for D2D communication, and an apparatus using the method.

The present invention also provides a definition of a scheduling request (SR), buffer status report (BSR), and power headroom report (PHR) for D2D communication.

In an aspect, a method for transmitting device-to-device (D2D) data in a wireless communication system is provided. The method includes establishing, by a first terminal, a D2D link with a second terminal, transmitting, by the first terminal to a base station, a scheduling request (SR) for an uplink and an SR for the D2D link, receiving, by the first terminal from the base station, scheduling information for the D2D link determined on the basis of the SR for the D2D link, and transmitting, by the first terminal to the second terminal, the D2D data on the basis of the scheduling information.

In another aspect, an apparatus for transmitting device-to-device (D2D) data in a wireless communication system is provided. The apparatus includes a radio frequency (RF) unit configured to transmit and receive a radio signal, and a processor operatively coupled to the RF unit and configured to establish a D2D link with a D2D target terminal, transmit, to a base station, a scheduling request (SR) for an uplink and an SR for the D2D link, receive, from the base station, scheduling information for the D2D link determined on the basis of the SR for the D2D link, and transmit, to the D2D target terminal, the D2D data on the basis of the scheduling information.

Whether an SR for the uplink and an SR for the D2D link are for the SR for the uplink or the SR for the D2D link may be indicated through a combination of the SR for the uplink and the SR for the D2D link.

The SR for the uplink may be transmitted in a first SR transmission-possible subframe, and the SR for the D2D link may be transmitted in a second SR transmission-possible subframe. The first SR transmission-possible subframe and the second SR transmission-possible subframe may be consecutive to each other.

The method may further includes transmitting, by the first terminal to the base station, a buffer status report (BSR) for the uplink and a BSR for the D2D link. The scheduling information may determined on the basis of the BSR for the D2D link.

The method may further includes transmitting, by the first terminal to the base station, a power headroom report (PHR) for the uplink and a PHR for the D2D link. The D2D data may be transmitted with transmission power determined based on the PHR for the D2D link.

A radio resource for device-to-device (D2D) communication can be effectively allocated.

D2D data can be effectively transmitted.

DESCRIPTION OF EXEMPLARY EMBODIMENTS

Figure 1:
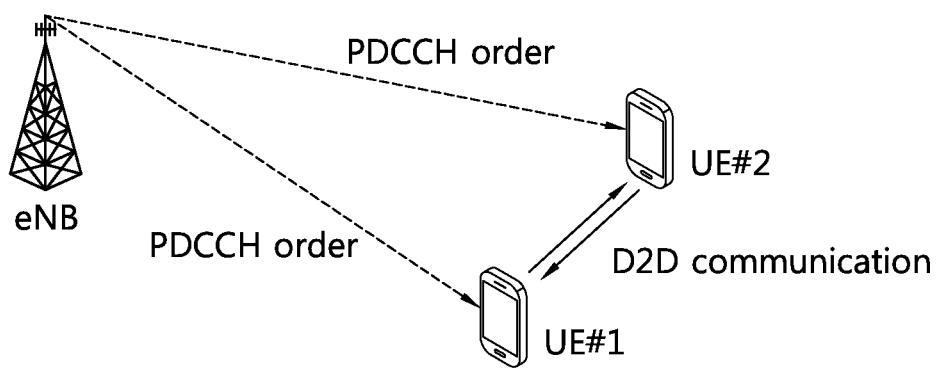
FIG. 1 is an example of device-to-device (D2D) communication using a physical downlink control channel (PDCCH) order.

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20. evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE.

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved Node-B (eNB), a base transceiver system (BTS), an access point, etc.

Hereinafter, the present invention is applied to $3^{rd}$ generation partnership project (3GPP) long term evolution (LTE) based on a 3GPP technical specification (TS) release 8 or 3GPP LTE-Advanced (LTE-A) based on 3GPP TS release 10. This is for exemplary purposes only, and thus the present invention is applicable to various communication systems. In the following description, LTE and/or LTE-A are collectively referred to as LTE.

In LTE, a physical channel may be divided into a data channel and a control channel. The data channel may be a physical downlink shared channel (PDSCH) and a physical uplink shared channel (PUSCH). The control channel may be a physical downlink control channel (PDCCH), a physical control format indicator channel (PCFICH), a physical hybrid-ARQ indicator channel (PHICH), and a physical uplink control channel (PUCCH).

The PDCCH occupies up to 4 OFDM symbols in a time domain, and is transmitted across a whole band of a system in a frequency domain. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

Meanwhile, device-to-device (D2D) communication implies directly communication between UEs. However, the D2D communication does not exclude the communication between an eNB and an UE. That is, the eNB may control and perform a series of processes for connecting, releasing, and accounting the D2D communication.

For the D2D communication, the UE must have an uplink (UL) transmission (TX) and reception (RX) capability. Preferably, the UE must have a capability of simultaneously performing UL TX and RX, that is, a full-duplex capability. However, when the UE simultaneously performs TX and RX in the same band, an implementation problem occurs under the current technology. Therefore, the UE preferably performs TX and RX by using different bands.

FIG. 1 is an example of D2D communication using a PDCCH order.

The D2D communication may be explicitly performed according to a D2D dedicated PDCCH order. For example, a specific field of a PDCCH may be modified to indicate PRACH transmission.

A UE#1 which intends to perform the D2D communication transmits to an eNB an access request message including an identifier (ID) of a UE#2 which is a counterpart of the D2D communication.

The eNB queries whether an access to the UE#2 is possible, and if the UE#2 is in an IDLE mode, allows the UE#2 to transition to a CONNECTED mode. If the access to the UE#2 is possible, UE pairing is performed for a D2D link between the UE#1 and the UE#2. In addition, the eNB may report information indicating that mutual UE paring is achieved to the UE#1 and the UE#2.

The eNB may deliver a transmission parameter for D2D communication (e.g., a resource region, a transmission time, a master/slave between UEs, a TX/RX mode, a TX/RX switching pattern, ACK/NACK timing, timing adjustment, etc.) through a higher layer (e.g., radio resource control (RRC)) signaling or a PDCCH.

The UE#1 and/or the UE#2 start the D2D communication based on the PDCCH order transmitted from the eNB. In this case, a PDCCH transmitted to the UE#1 is defined as a $1^{st}$ PDCCH, and a PDCCH transmitted to the UE#2 is defined as a $2^{nd}$ PDCCH. In this case, the UE#1 may be configured as a master UE (or a primary UE) and the UE#2 may be configured as a slave UE (or a secondary UE), and thus the master UE may represent the D2D communication. Alternatively, the UE#1 the UE#2 may be configured to have equal relations.

If the UE#1 is configured as the master UE, the UE#1 which receives the $1^{st}$ PDCCH performs PRACH transmission through an uplink band in a subframe n. Since the PRACH is transmitted to the UE#2 as a target, it may be transmitted with predetermined power. The power may be estimated by the eNB in a UE pairing process and may be delivered using RRC signaling. Alternatively, the power may be determined dynamically by applying a power control. The UE#2 may transmit a PUSCH in the subframe n together with a random access preamble. Although a format of the subframe may be a PUSCH format, the format may also be a PDSCH format or a newly designed format.

The UE#2 may know that the PRACH can be received from the UE#1 in the subframe n through the $2^{nd}$ PDCCH. The UE#2 receives the random access preamble and the PUSCH in the subframe n. A modulation and coding scheme (MCS) for the PUSCH may be predetermined, or may be acquired through the preamble or the $2^{nd}$ PDCCH. The UE#2 generates ACK or NACK according to whether reception is successful.

The UE#2 may transmit ACK or NACK in a subframe n+k(k>1). ACK/NACK transmission and/or PUSCH retransmission may be performed simultaneously with PUSCH transmission from the UE#2 to the UE#1. For this, the eNB may deliver a PDCCH order to each UE. Alternatively, the PUSCH transmission from the UE#2 to the UE#1 may be performed without an additional PDCCH order.

Upon receiving the NACK, the UE#1 may perform PUSCH retransmission in a subframe n+k+r(k>r).

If it is desired to end the D2D communication, the UE#1 and/or the UE#2 request the eNB to release a D2D connection. The release request of the D2D connection may be performed by higher layer signaling. Alternatively, the D2D communication may end on the basis of a predetermined transmission count or time.

Figure 2:
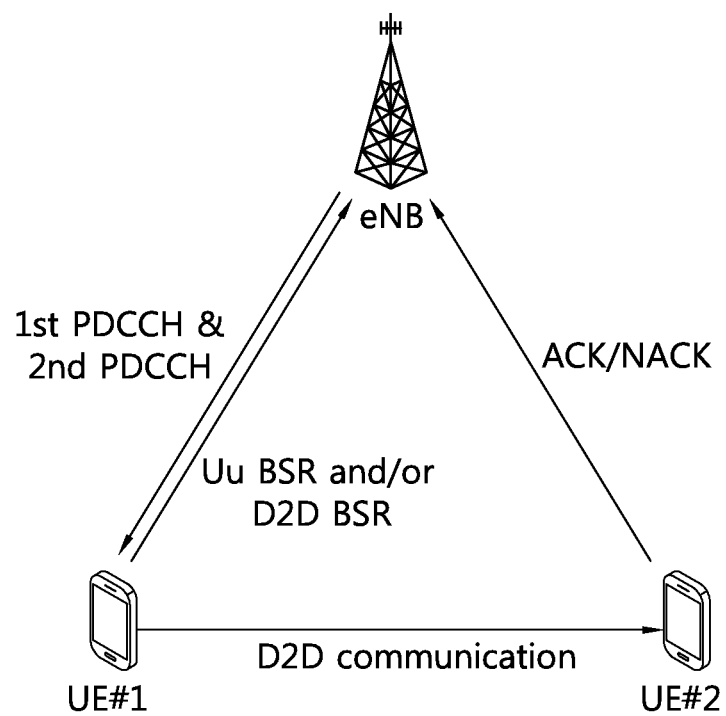
FIG. 2 shows an example of a flow of information exchanged between an eNodeB (eNB) and a user equipment (UE) in D2D communication.

Meanwhile, in addition to the aforementioned method, various methods may exist to implement the D2D communication. It is assumed hereinafter that the eNB schedules transmission and reception of the D2D link similarly to the aforementioned method. FIG. 2 shows an example of a flow of information exchanged between an eNB and a UE in D2D communication.

Referring to FIG. 2, PUSCH transmission between a UE#1 and an eNB may be performed based on a UL grant through a PDCCH similarly to typical uplink transmission. In addition, in D2D communication between the UE#1 and a UE#2, if a transmission scheme similar to the existing PUSCH transmission is used, the D2D communication may also be performed based on a UL grant through the PDCCH.

As in the case of FIG. 1, a $1^{st}$ PDCCH includes scheduling information for uplink transmission between the UE#1 and the eNB as a PDCCH for the UE#1, and a $2^{nd}$ PDCCH includes control information for D2D communication between the UE#1 and the UE#2 as a PDCCH for the UE#2. However, in the example of FIG. 2, the eNB transmits the $1^{st}$ PDCCH and the $2^{nd}$ PDCCH to the UE#1 which is a master UE, and the UE#1 establishes a D2D link. A circular structure of eNB-UE#1-UE#2-eNB, in that order, is assumed as to HARQ for the D2D link. That is, HARQ for D2D communication between the UE#1 and the UE#2 in the D2D link is delivered from the UE to the eNB.

Hereinafter, it is described a method in which the eNB configures and manages buffer status reports (BSRs) respectively for the links as essential information for scheduling an uplink transmission and a D2D link.

The UE may select one media access control (MAC) control element (CE) among two types of BSR MAC CEs and may transmit it to the eNB.

In a short BSR case, transmission is performed by including a logical channel group (LCG) ID which is an identifier of a logical channel group to indicate to which logical channel group a field indicating a buffer size belongs.

In a long BSR case, transmission is performed by including buffer sizes from a logical channel group of which an LCG ID is 0 to a logical channel group of which an LCG ID is 3 without the identifier of the logical channel group.

If the BSR is triggered or transmission-possible data is present only in one logical channel group, the UE transmits the data by selecting the short BSR. If transmission-possible data is present in two or more logical channel groups, the UE transmits the data by selecting the long BSR.

The UE triggers the BSR when at least one of the following conditions is satisfied.

In a situation where transmission-possible data is not present in a logical channel group, the transmission-possible data is generated.

In a situation where transmission-possible data is present in a specific logical channel group, the transmission-possible data is generated in a logical channel group having a higher priority than the specific logical channel group.

A padding size of a MAC protocol data unit (PDU) to be generated using an uplink resource allocated from the eNB is equal to or greater than a sum of a size of a BSR MAC CE and a size of a corresponding sub-header.

In a situation where the padding size of the MAC PDU to be generated using the uplink resource allocated from the eNB is equal to or greater than a sum of a size of a short BSR MAC CE and a size of a corresponding sub-header but is less than a sum of a size of a long BSR MAC CE and a size of a corresponding sub-header, transmission-possible data is present in two or more logical channel groups.

A periodic BSR-Timer used for periodic BSR transmission expires.

The aforementioned BSR may be extendedly applied also to the D2D link. That is, the eNB may acquire information on a size of data waited to be transmitted from the UE to properly allocate a radio resource of an uplink and/or a D2D link. For example, the eNB may acquire information regarding whether the UE has data to be transmitted, and if so, whether a PDCCH including a grant for the data needs to be transmitted, on the basis of a scheduling request (SR). Hereinafter, the SR will be described in brief.

The UE requires an uplink resource to transmit a BSR to the eNB. When the BSR is triggered, if a pre-allocated uplink resource exists, the UE immediately transmits the BSR to the eNB by using the uplink resource. However, when the BSR is triggered, if the pre-allocated resource does not exist, the UE performs an SR process so that an uplink resource is allocated from the eNB. Regarding the SR, a PUCCH SR which simply plays a role of a flag exists as a 1-bit signal. A flag-type SR is designed to decrease an uplink overhead.

Figure 3:
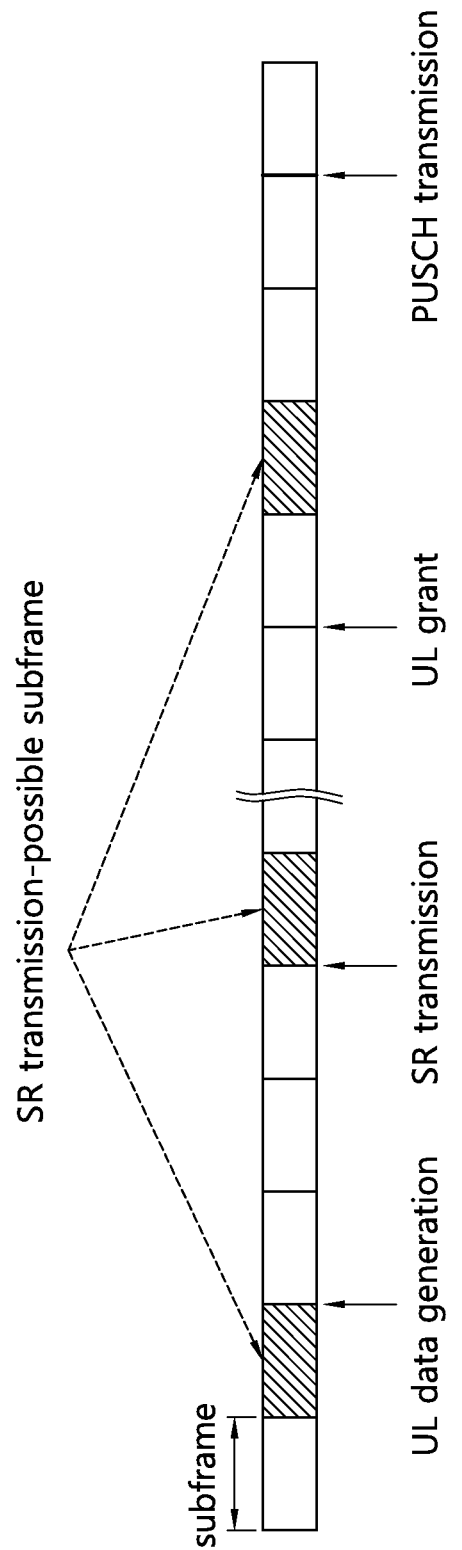
FIG. 3 shows an example of a scheduling request (SR) transmission mechanism.

In addition, an SR transmission-possible subframe with a period of N and an offset may be designated. FIG. 3 shows an example of an SR transmission mechanism.

The example of FIG. 3 assumes a situation in which data to be transmitted to a UE TX buffer exists, and the data is data having a top priority which requires immediate transmission.

If a UL grant is not present, a UE transmits an SR in a reserved SR transmission-possible subframe. The SR transmission may be repeated until the UL grant is received. Meanwhile, when the SR is received in a specific subframe, an eNB can know from which UE the SR is transmitted, even if a UE ID does not exist.

If the reserved SR transmission-possible subframe does not exist, the UE must depend on a random access mechanism. In this case, a great number of UEs perform the SR by using a common resource. Since the SR includes the UE ID, a relatively great number of resources are consumed. Such a method is advantageous in a situation where the great number of UEs transmit data intermittently (i.e., a low traffic intensity, a lower scheduling intensity).

Figure 4:
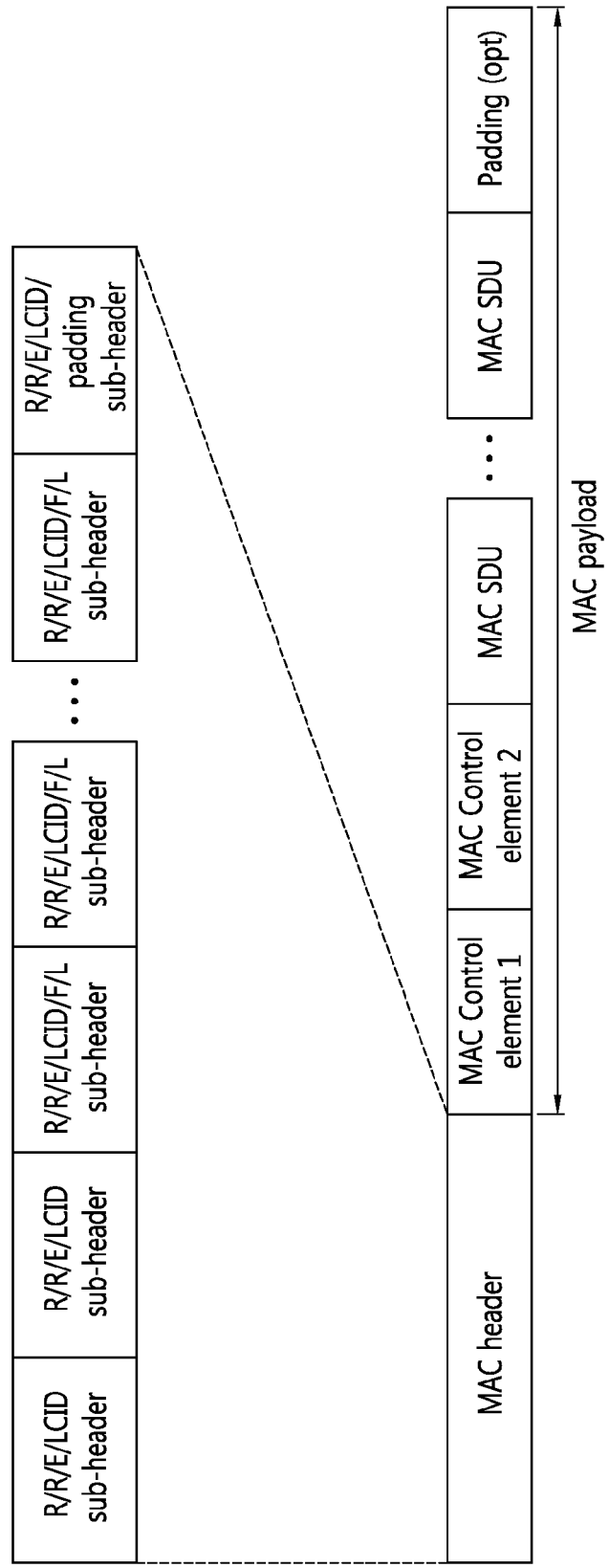
FIG. 4 shows an example of a media access control (MAC) protocol data unit (PDU) including a MAC header, a MAC control element (CE), a MAC serving data unit (SDU), and a padding.

FIG. 4 shows an example of a MAC PDU including a MAC header, a MAC CE, a MAC serving data unit (SDU), and a padding.

A BSR for a UL grant may be transmitted through a MAC header and MAC CE of a MAC layer. Referring to FIG. 4, a logical channel ID (LCID) included in the MAC header plays a role of indicating a presence/absence of the BSR or reporting a presence/absence of a power headroom report (PHR). The following is a brief description on the PHR.

In order for the UE to effectively transmit data to the eNB, power used in uplink transmission needs to be properly adjusted. If the transmission power is too low, the eNB cannot properly receive the data. Otherwise, if the transmission power is too high, although the eNB can properly receive the data of the UE, it may act as an interference when data of another UE is received. Therefore, from an overall network perspective, the eNB needs to optimize the power used in the uplink transmission of the UE.

In order for the eNB to adjust the transmission power of the UE, essential information needs to be acquired from the UE. For this, the PHR may be defined. In this case, a power headroom implies power that can be additionally used by the UE from current transmission power. In other words, the power headroom implies a difference between maximum available transmission power and the current transmission power.

If the PHR is received from the UE, the eNB determines power to be used in next uplink transmission of the UE on the basis of the PHR. The determined transmission power is expressed with a resource block size and an MCS, and is considered in a next UL grant of the UE.

Meanwhile, frequent transmission of the PHR may cause a waste of a radio resource. Therefore, a PHR trigger condition is defined in LTE for the following cases.

After most recent PHR transmission, a pathloss is changed to be greater than or equal to a reference value (i.e., d1-PathlossChange).
A periodicPHR-Timer expires.
A PHR-related parameter is (re)configured.

When the PHR is triggered according to the above condition, a MAC layer of the UE performs PHR transmission through the following procedure.

A power headroom value is acquired from a physical layer.
On the basis of the power headroom value, a PHR MAC CE is generated and transmitted.
The periodicPHR-Timer restarts.

As described in the above procedure, the UE transmits information regarding the power headroom to the eNB through the PHR MAC CE. For this, the MAC header includes an LCID for the PHR MAC CE. A logical channel may be grouped to decrease a signaling overhead, and may be indicated in a group unit.

Meanwhile, as described above, BSR and/or PHR transmission for scheduling of the D2D link may be performed.

First, it is possible to use a method of simultaneously scheduling an uplink and a D2D link in one subframe. In the above method, a BSR and/or PHR for the respective links need to be defined individually. In addition, the UE may operate an independent buffer for each link to distinguish a destination to which data is transmitted. However, the PHR may be defined for both of the uplink and the D2D link. That is, only the BSR may be separately operated, and the PHR may be operated as one entity. If one PHR is operated, a transmission power control, DCI format, transport block size (TBS), or the like according to a characteristic of each link may be defined separately, and a slight modification from the existing PHR may be required.

In addition, it is possible to use a method in which one scheduling grant is present in one subframe. A BSR and/or PHR for each link need to be defined also in the above method. The scheduling grant is not necessarily a UL grant, and a case where a DL grant or its modification is used for a D2D link is also included. The UE may operate only the BSR separately, and may operate the PHR as one entity.

Figure 5:
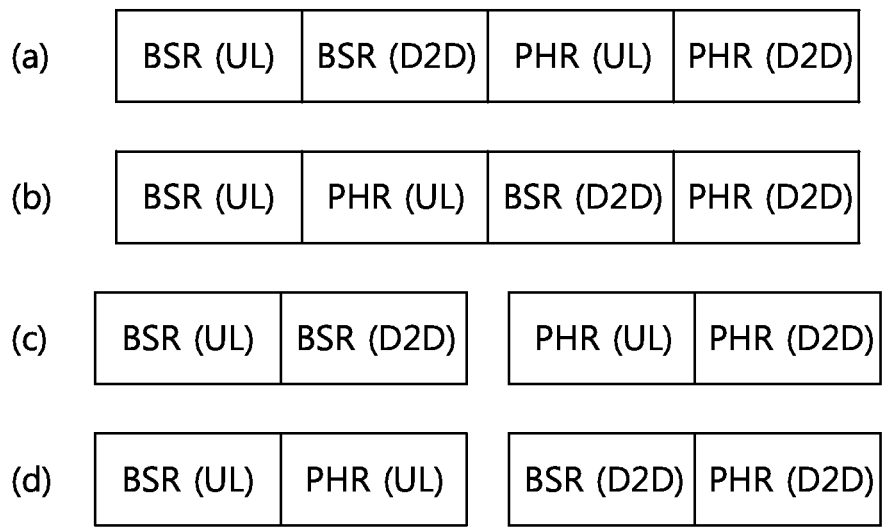
FIG. 5 show a configuration of a buffer status report (BSR) field and a power headroom report (PHR) field for an uplink and a D2D link according to an embodiment of the present invention.

Meanwhile, the UE may request the eNB to provide a resource for the uplink and/or the D2D link by using one SR. In this case, an identifier or an identification scheme may be defined to identify for which link the BSR or the PHR is present. FIG. 5 shows a configuration of a BSR field and a PHR field for an uplink and a D2D link according to an embodiment of the present invention. Referring to FIG. 5, BSR fields or PHR fields for two links are configured in the same subframe or MAC PDU in (a) and (b), and are configured in different subframes or MAC PDUs in (c) and (d).

For example, if it is assumed that the BSR and/or the PHR are transmitted in MAC CEs 1 and 2, two links can be distinguished in a PDU level in such a manner that a first MAC PDU uses MAC control information for an uplink and a second MAC PDU uses MAC control information for a D2D link.

For another example, a combination order or the like of the CE may be determined in advance so that BSR transmission and PHR transmission can be achieved without an additional link indication.

For another example, if it is assumed that transmission is not performed simultaneously for two links in one subframe, the BSR and PHR received in one subframe may include information of only one link.

For another example, if a specific subframe is configured to be used only for a specific link, it may not be necessary to additionally report to which link the BSR and PHR belong.

Meanwhile, to which link the SR belongs may be distinguished in a physical layer. That is, to which link the SR belongs may be distinguished on the basis of an SR resource, a subframe, a slot, a resource block, etc. Alternatively, the SR may include a field indicating to which link the SR belongs. However, a physical layer channel needs to be changed to use the above method.

Figure 6:
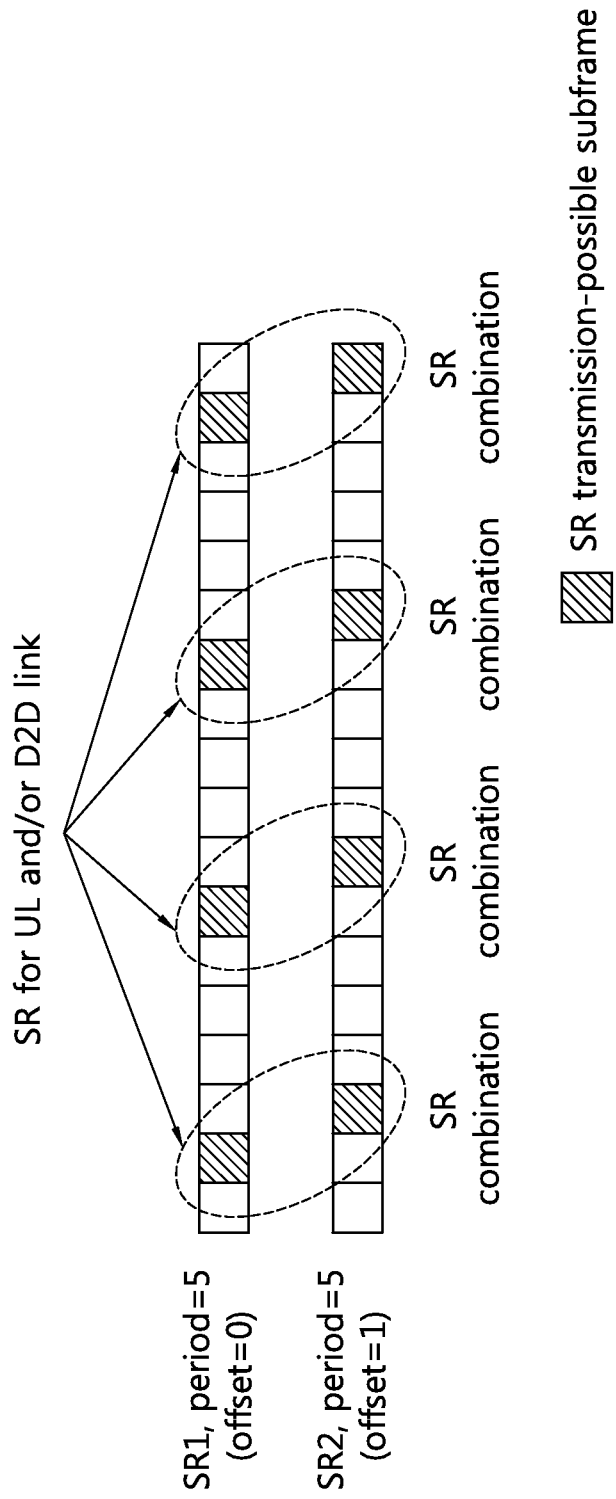
FIG. 6 shows SR transmission based on an SR combination according to an embodiment of the present invention.

To distinguish to which link the SR belongs without a change in the physical channel, a 1 bit SR transmitted in an SR transmission-possible subframe and a 1 bit SR of a next SR transmission-possible subframe (or a subframe after a designated time) may be combined. FIG. 6 shows SR transmission based on an SR combination according to an embodiment of the present invention.

In the example of FIG. 6, how to combine subframes may be predetermined through a PDCCH order or may be determined through paring based on a subframe index or the like. In this case, SR resources are preferably combined by continuously allocating the SR resources for a fast SR.

Figure 7:
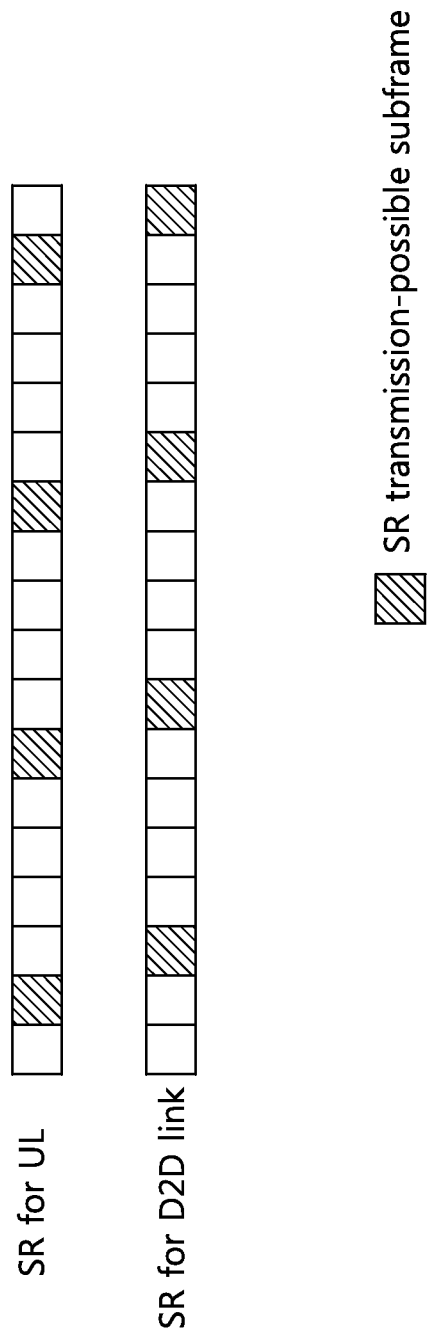
FIG. 7 shows SR transmission based on an individual SR according to an embodiment of the present invention.

In order to distinguish to which link the SR belongs without a change in a physical channel, two SRs having different periodicities may be configured so that one is used for the link and the other is used for the D2D link. FIG. 7 shows SR transmission based on an individual SR according to an embodiment of the present invention.

In the example of FIG. 7, different SR periodicities may be given in a form of one period and an offset, or may be given with different periods.

Although two transmission links (i.e., an uplink and a D2D link) are described for example in the aforementioned methods, the methods can also be extendedly applied to a case where a plurality of uplinks and D2D links are present. In addition, the aforementioned methods can be implemented in combination.

Figure 8:
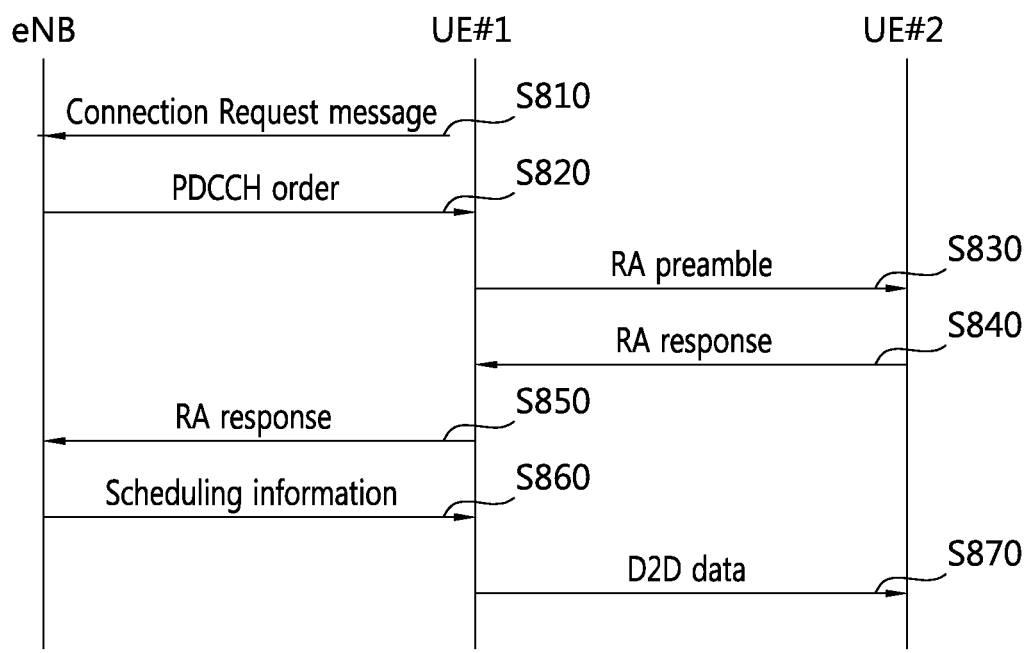
FIG. 8 is a flowchart showing a method of transmitting D2D data according to an embodiment of the present invention.

FIG. 8 is a flowchart showing a method of transmitting D2D data according to an embodiment of the present invention.

As described above, D2D communication implies direct communication between UEs. The UEs which perform the D2D communication may also be called a $1^{St}$ UE and a $2^{nd}$ UE, and according to a role in the D2D communication, may be called a master UE/slave UE, a primary UE/secondary UE. It is assumed hereinafter that the 1$^{St}$ UE is a master UE, and the 2$^{nd}$ UE is a slave UE, that is, a D2D target UE.

The 1$^{st}$ UE transmits a connection request message for a D2D link to an eNB to establish the D2D link (step S810). The connection request message may include an ID of the 2$^{nd}$ UE.

The eNB queries whether an access to the 2$^{nd}$ UE is possible, and if the access is possible, performs UE paring for the D2D link. If all preparations for the D2D communication are complete, the eNB transmits a physical downlink control channel (PDCCH) order to the 1$^{st}$ UE (step S820).

The 1$^{st}$ UE transmits a random access preamble to the 2$^{nd}$ UE through a PRACH (step S830). The random access preamble is generated according to the PDCCH order, and may be transmitted through the PRACH.

The 2$^{nd}$ UE transmits a random access response to the 1$^{st}$ UE, and establishes the D2D link on the basis thereof (step S840).

The 1$^{st}$ UE transmits a message for requesting scheduling to the eNB (step S850). The message for requesting the scheduling may be performed based on SR transmission, and the eNB may determine an allocation of a radio resource for an uplink of the 1$^{st}$ UE and a radio resource for the D2D link. In this case, a BSR of the 1$^{st}$ UE may be transmitted for an effective allocation of the radio resource and/or a PHR of the 1$^{st}$ UE may be transmitted to determine proper transmission power. The eNB may allocate the radio resource or may determine the transmission power on the basis of the BSR and/or the PHR. A method of transmitting the BSR and PHR for the uplink of the 1$^{st}$ UE and the BSR and PHR for the D2D link is as described above.

For example, whether each of an SR for the uplink and an SR for the D2D link is for the SR for the uplink or the SR for the D2D link may be indicated through a combination of the SR for the uplink and the SR for the D2D link.

For example, the SR for the uplink may be transmitted in a 1$^{st}$ SR transmission-possible subframe, and the SR for the D2D link may be transmitted in a 2$^{nd}$ SR transmission-possible subframe. The 1$^{st}$ SR transmission-possible subframe and the 2$^{nd}$ SR transmission-possible subframe may be consecutive to each other or may have different periodicities.

The eNB determines a radio resource to be allocated to uplink transmission and/or D2D communication of the 1$^{st}$ UE, and transmits scheduling information to the 1$^{st}$ UE (step S860). In this case, the radio resource may be based on the SR and/or the BSR.

The 1$^{st}$ UE and the 2$^{nd}$ UE perform the D2D communication based on scheduling information of the D2D link (step S870). In this case, transmission power of the 1$^{st}$ UE may be based on the PHR.

Meanwhile, uplink transmission of the 1$^{st}$ UE and D2D data transmission may be performed in the same frequency band. That is, the D2D communication may be performed in an uplink frequency band of the UE.

Figure 9:
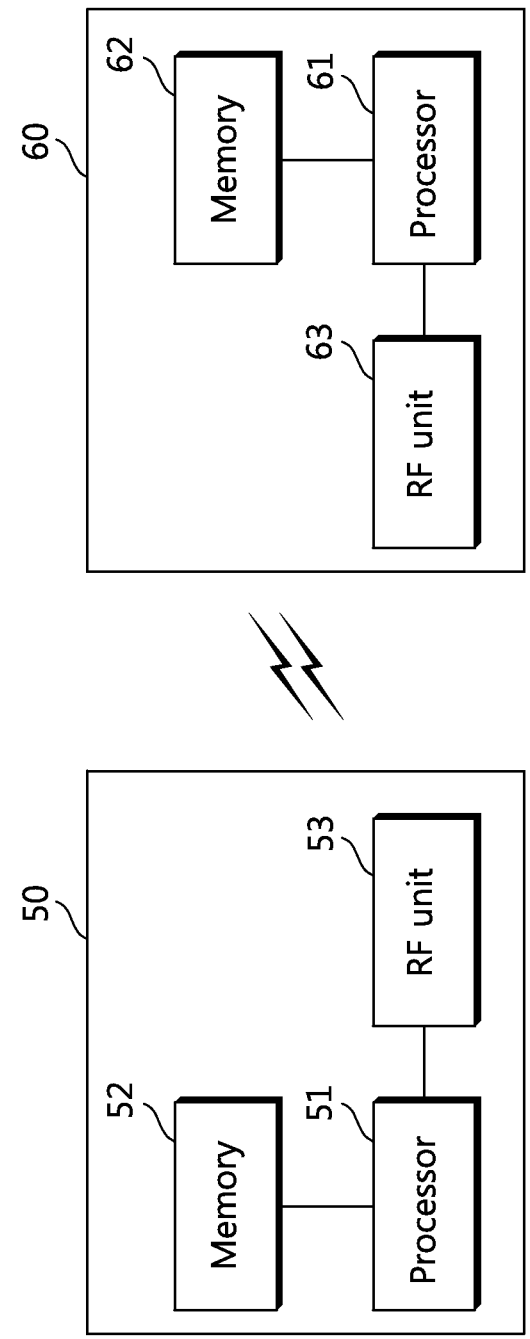
FIG. 9 is a block diagram of a wireless communication system according to an embodiment of the present invention.

FIG. 9 is a block diagram of a wireless communication system according to an embodiment of the present invention.

An eNB 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the eNB may be implemented by the processor 51.

A UE 60 includes a processor 61, a memory 62, and an RF unit 63. The memory 62 is coupled to the processor 61, and stores a variety of information for driving the processor 61. The RF unit 63 is coupled to the processor 61, and transmits and/or receives a radio signal. The processor 61 implements the proposed functions, procedures, and/or methods. In the aforementioned embodiment, operations of a UE#1 and a UE#2 may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting device-to-device (D2D) data in a wireless communication system, the method comprising:

establishing, by a first terminal, a D2D link with a second terminal;

transmitting, by the first terminal to a base station, a scheduling request (SR) for an uplink and an SR for the D2D link;

receiving, by the first terminal from the base station, scheduling information for the D2D link determined on the basis of the SR for the D2D link; and transmitting, by the first terminal to the second terminal, the D2D data on the basis of the scheduling information, wherein the SR for the uplink is transmitted in a first SR transmission-possible subframe;

wherein the SR for the D2D link is transmitted in a second SR transmission-possible subframe; and wherein the first SR transmission-possible subframe and the second SR transmission-possible subframe have different periodicities.

2. The method of claim 1, wherein the establishing of the D2D link comprises:

transmitting, by the first terminal to the base station, a request message for a connection of the D2D link;

receiving, by the first terminal from the base station, a physical downlink control channel (PDCCH) order in response to the request message;

transmitting, by the first terminal to the second terminal, a random access preamble through a physical random access channel (PRACH) on the basis of the PDCCH order; and receiving, by the first terminal from the second terminal, a response for the random access preamble.

3. The method of claim 1, wherein whether an SR for the uplink and an SR for the D2D link are for the SR for the uplink or the SR for the D2D link is indicated through a combination of the SR for the uplink and the SR for the D2D link.

4. The method of claim 3,
wherein the SR for the uplink is transmitted in a first SR transmission-possible subframe;
wherein the SR for the D2D link is transmitted in a second SR transmission-possible subframe; and
wherein the first SR transmission-possible subframe and the second SR transmission-possible subframe are consecutive to each other.

5. The method of claim 1, further comprising
transmitting, by the first terminal to the base station, a buffer status report (BSR) for the uplink and a BSR for the D2D link, wherein the scheduling information is determined on the basis of the BSR for the D2D link.

6. The method of claim 5, wherein the BSR for the uplink and the BSR for the D2D link contain a link identifier for identifying a transmission link.

7. The method of claim 5, wherein the BSR for the uplink and the BSR for the D2D link are distinguished with a media access control (MAC) protocol data unit (PDU).

8. The method of claim 1, further comprising transmitting, by the first terminal to the base station, a power headroom report (PHR) for the uplink and a PHR for the D2D link, wherein the D2D data is transmitted with transmission power determined based on the PHR for the D2D link.

9. The method of claim 1, wherein the uplink and the D2D link have the same frequency band.

10. An apparatus for transmitting device-to-device (D2D) data in a wireless communication system, the apparatus comprising:
a radio frequency (RF) unit configured to transmit and receive a radio signal; and
a processor, operatively coupled to the RF unit and configured to:
establish a D2D link with a D2D target terminal;
transmit, to a base station, a scheduling request (SR) for an uplink and an SR for the D2D link;
receive, from the base station, scheduling information for the D2D link determined on the basis of the SR for the D2D link; and
transmit, to the D2D target terminal, the D2D data on the basis of the scheduling information,
wherein the SR for the uplink is transmitted in a first SR transmission-possible subframe;
wherein the SR for the D2D link is transmitted in a second SR transmission-possible subframe; and
wherein the first SR transmission-possible subframe and the second SR transmission-possible subframe have different periodicities.

11. The apparatus of claim 10, wherein the processor is configured to establish the D2D link by:
transmitting, to the base station, a request message for a connection of the D2D link;
receiving, from the base station, a physical downlink control channel (PDCCH) order in response to the request message;
transmitting, to the D2D target terminal, a random access preamble through a physical random access channel (PRACH) on the basis of the PDCCH order; and
receiving, from the D2D target terminal, a response for the random access preamble.

12. The apparatus of claim 10, wherein whether an SR for the uplink and an SR for the D2D link are for the SR for the uplink or the SR for the D2D link is indicated through a combination of the SR for the uplink and the SR for the D2D link.

13. The apparatus of claim 10,
wherein the processor is configured to transmit, to the base station, a buffer status report (BSR) for the uplink and a BSR for the D2D link, and
wherein the scheduling information is determined on the basis of the BSR for the D2D link.

14. The apparatus of claim 10,
wherein the processor is configured to transmit, to the base station, a power headroom report (PHR) for the uplink and a PHR for the D2D link, and
wherein the D2D data is transmitted with transmission power determined based on the PHR for the D2D link.

\* \* \* \* \*